United States Patent [19]

Fischer

[11] 4,389,809

[45] Jun. 28, 1983

[54] CONNECTING ELEMENT

[76] Inventor: Artur Fischer, Weinhalde 14-18, D-7244 Tumlingen, Waldachtal 3, Fed. Rep. of Germany

[21] Appl. No.: 222,755

[22] Filed: Jan. 5, 1981

Related U.S. Application Data

[63] Continuation-in-part of Ser. No. 175,196, Jul. 31, 1980.

[30] Foreign Application Priority Data

Aug. 23, 1979 [DE] Fed. Rep. of Germany ....... 2934094
Sep. 1, 1979 [DE] Fed. Rep. of Germany ....... 2935467

[51] Int. Cl.³ ............................................ A63H 33/10
[52] U.S. Cl. ........................................ 46/26; 403/297; 430/344; 411/60; 411/521
[58] Field of Search .................. 46/26, 23, 16, 17; 403/319, 297, 344, 313

[56] References Cited

U.S. PATENT DOCUMENTS

| 2,754,716 | 7/1956 | Bourns | 411/479 |
| 2,885,822 | 5/1959 | Onanian | 46/26 |
| 3,303,581 | 2/1967 | Levinson | 46/16 |
| 3,355,837 | 12/1967 | Pederson | 46/17 |
| 3,913,444 | 10/1975 | Otte | 411/479 |
| 4,114,509 | 9/1978 | Poe | 411/60 |

FOREIGN PATENT DOCUMENTS

| 42117 | 1/1888 | Fed. Rep. of Germany | 403/297 |
| 2049451 | 12/1980 | United Kingdom | 46/26 |
| 2056291 | 3/1981 | United Kingdom | 46/26 |

Primary Examiner—F. Barry Shay
Attorney, Agent, or Firm—Michael J. Striker

[57] ABSTRACT

A pin-shaped connecting element for connecting toy structural elements each having at least two openings, has an elongated body part which can be received in one opening of the structural elements and has an elongated slot and a plurality of transverse slots subdividing the body part into a plurality of independently resiliently yieldable sections, and an arresting member insertable in an intersecting opening of the structural elements and engageable into a respective one of the transverse slots so as to arrest the elongated body part in the structural elements. The arresting member may have one or two projections engaging in one or two transverse slots in the region of the transverse opening.

8 Claims, 2 Drawing Figures

CONNECTING ELEMENT

CROSS-REFERENCE TO RELATED APPLICATION

This application is a continuation-in-part of copending application Ser. No. 175,196 filed July 31, 1980.

BACKGROUND OF THE INVENTION

The present invention relates to a connecting element for connecting toy structural elements having openings and advantageously constituted of wood.

A connecting element of the above-mentioned general type is known in the art. A known pin-shaped connecting element has a tubular portion with an outer diameter which is somewhat greater than the diameter of the openings of the toy structural element. The connecting element has a longitudinal slot rendering the same elastically yieldable, and a transverse slot which extends from the longitudinal slot over a part of the periphery of the portion and subdivides the latter into cooperating sections. This construction is disclosed in the U.S patent application 175,196.

When the pin-shaped connecting element has the above-mentioned construction, each section of the tubular portion is resiliently yieldable independently of the other sections. When the opening tolerances of the toy structural elements are different, each section of the connecting element is not affected by other sections and exactly fits the opening in which it is inserted. with such a connecting element it is no longer possible that the connecting element is firmly seated in one of the openings and at the same time has only a small friction or no friction at all in the other opening. Thereby the thus designed pin-shaped connecting element makes possible the connection of toy structural elements having non-uniform dimensions. When such a pin-shaped connecting element is utilized for connecting the toy structural elements, they are actually connected with one another by friction. This means that in condition of higher loading of the connection, the retention of the structural elements is no longer guaranteed.

SUMMARY OF THE INVENTION

Accordingly, it is an object of the present invention to provide a connecting element for connecting toy structural elements, which avoids the disadvantages of the prior art.

More particularly, it is an object of the present invention to design such a connecting element which connects toy structural elements with one another not only under the action of friction, but also provides for such a connection that it cannot be pulled from the toy structural element, even in condition of high loading.

In keeping with these objects and with others which will become apparent hereinafter, one feature of the present invention resides, briefly stated, in a pin-shaped connecting element which has an elongated body part with a portion provided with a longitudinal slot and at least one transverse slot subdividing this portion into at least two sections, wherein the transverse slot is arranged so that when the portion is inserted into one opening of a structural element, the transverse slot is located in the region of the other opening intersecting the one opening, and an arresting member is provided which is arranged to extend through the other intersecting opening and to engage in the transverse slot of the portion.

For connecting two structural elements with one another, the pin-shaped connecting element is inserted into two aligned openings of the structural elements. The longitudinal slot and the transverse slot provide for resiliently yieldable action which leads to friction between the connecting element and the structural elements. Because of the predetermined location of the transverse slot of the portion of the connecting element, it is guaranteed that the slot is arranged in the region of an opening intersecting the opening in which the connecting element is inserted. The arresting member is inserted into the above-mentioned intersecting opening so as to engage in the transverse slot of the portion of the pin-shaped connecting element. Thereby, a key-like locking action is attained so that the structural elements are connected with one another in pulling-resistant manner. The playing child is able to select the connection which can provide for the stability of toy models in favorable manner. Because of the variations possible for the connection, which is accompanied by different degrees of difficulty, playing attractiveness of the assembly kit increases, and the assembly kit can be utilized both for younger children and older children.

It is to be understood that the above-mentioned portion of the connecting element may be provided with a plurality of slots which are distributed on this portion so that each slot is located in the region of the intersecting opening of a respective one of the structural elements to be assembled with one another. In this case, a plurality of the arresting members can be inserted into the intersecting openings so as to engage in the respective slots.

In accordance with another feature of the present invention, the arresting member is provided with a collar which is insertable in the intersecting opening, and also with a head which abuts against the outer surface of the respective toy structural element. The provision of the collar improves the insertion and the support of the arresting member in the intersecting opening. The head of the arresting member serves for limiting the insertion and also provides for a gripping possibility. A playing child can grip the head and remove the arresting member from the respective toy structural element.

The transverse slot in the above-mentioned portion of the connecting element may be arranged so that two slots are located simultaneously in the region of the one intersecting opening. In such a construction, the arresting member is provided with two projections which are arranged so that when the arresting member is inserted into the intersecting openings, the projections engage in the two slots of the pin-shaped connecting elements. The two projections of the arresting member may be connected with one another by a web which is engageable into the longitudinal slot of the pin-shaped connecting element. Finally, the tip of the projection or projections may be rounded.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
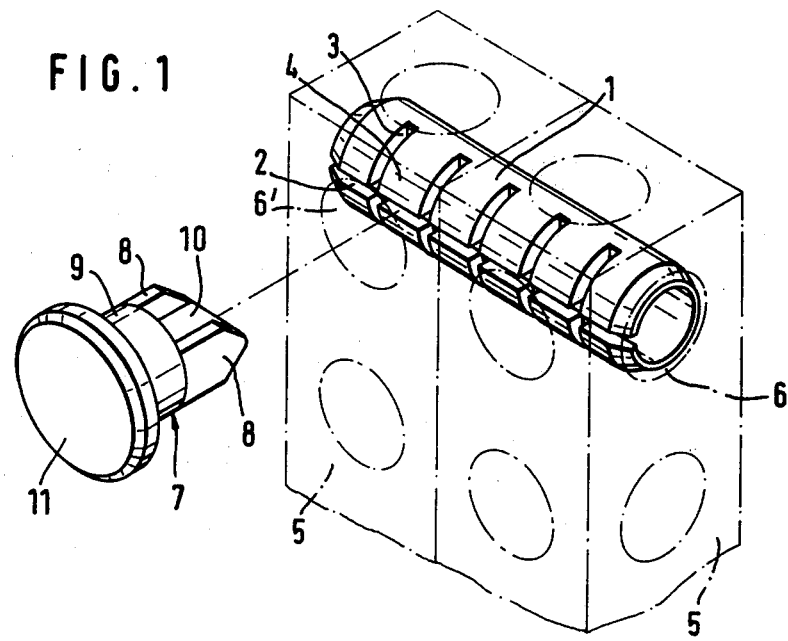
FIG. 1 is a view showing a connecting element for connecting toy structural elements of an assembly kit with one another, the connecting element including a pin-shaped elongated body part and an arresting member engageable with the latter.

The connecting element for connecting toy structural elements is shown in FIG. 1 and includes an elongated body part which is identified by reference numeral 1 and an arresting member which is identified by reference numeral 7.

The elongated body part has a throughgoing longitudinal slot 2 rendering the same elastically yieldable. A plurality of transverse slots 3 extend from the longitudinal slot 2 transversely to the latter and over a part of the periphery of the body part 1. The transverse slot 3 subdivides the body part 1 into a plurality of interconnected sections 4 which are resiliently yieldable independently of one another. Thereby it is possible to assemble the toy structural elements 5 whose openings 6 have different tolerances, and also to provide connection in the event when the openings of the toy structural elements 5 are insignificantly offset relative to one another.

When the elongated body part 1 inserted into the openings 6 of the toy structural element 5, they become connected with one another under the action of friction.

In order to provide for pulling-resistant connection, in addition to the frictional connection, the connecting element includes an arresting member 7. The number and location of the transverse slots 3 are so selected that when the elongated body part 1 is inserted in the aligned openings 6, two slots 3 which laterally limit one section are arranged in the region of opening 6' which intersect the opening 6. The arresting member 7 is inserted into the opening 6' and engages in the transverse slots 3 so that it becomes impossible to pull the elongated body part 1 from the toy structural element 5.

In order to allow the engagement of the arresting member 7 into the transverse slots 3 of the elongated body part 1, the arresting member 7 is provided with two projections 8. The projections 8 may extend parallel to one another at opposite sides of the axis of the arresting member 7. When the arresting member 7 is inserted into the respective intersecting opening 6', the projections 8 engage in two slots 3 which laterally limit the respective section 4 of the elongated body part 1.

The arresting member 7 is further provided with a collar 9 which has a diameter corresponding to the diameter of the intersecting opening 6' and carries the above-mentioned projections 8. The collar 9 also serves for locking of the arresting member 7 in the respective opening 6'. For attaining an improved stability, the projections 8 are connected with one another by a transverse web 10. The transverse web 10 is arranged so that when the arresting member 7 is inserted into the respective intersecting opening 6', the transverse web 10 engages into the longitudinal slot 2 of the elongated body part 1. The transverse web 10 may extend through the axis of the arresting member 7.

The arresting member 7 is further provided with a head 11. The head 11 is connected with the collar 9 which in turn carries the projections 8 and the transverse web 10. The head 11 is arranged so that when the arresting member 7 is inserted into the intersecting opening 6', the head 11 abuts against the outer surface of the respective toy structural element. The head 11 is utilized for withdrawing of the arresting member 7 from the toy structural elements. A playing child can grip the head 11 and pull the arresting member 7 from the respective intersecting opening 6.

Figure 2:
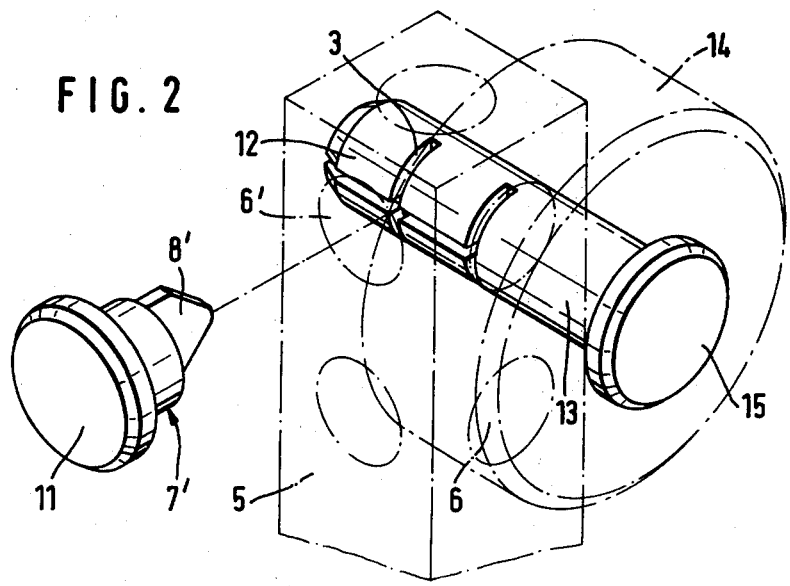
FIG. 2 is a view substantially corresponding to that of FIG. 1, but showing the arresting member in accordance with another embodiment of the invention, and also showing one of the toy structural elements formed as a wheel.

FIG. 2 shows a connecting element in accordance with a somewhat different embodiment of the invention. The connecting element of FIG. 2 also has an elongated body part 12 and is provided not only with sections which are formed between slots, but also with a non-slotted section 13. The section 13 is suitable, for example, for supporting a wheel 14. In order to fix the wheel 14 in an axial direction, an end side of the section 13 is provided with a head 15 which serves as an abutment.

The portion of the elongated body part 12, which is received in the opening 6 of the toy structural element 5, is subdivided into the sections by the transverse slots 3, similarly to the elongated body part of FIG. 1. The transverse slots 3 are arranged so that when the elongated body part 12 is inserted in the toy structural element 5 in flush manner, one transverse slot 3 is located in the center of the intersecting opening 6', in contrast to the two slots of the connecting element of FIG. 1. An arresting member 7' is designed in accordance with the above-mentioned location of the transverse slot 3 in the center of the intersecting opening 6'. More particularly, the arresting member 7' has only one projection 8' arranged in the center of the former. The projection 8' extends through the axis of the arresting member 7'.

When the arresting member is inserted into the intersecting opening 6', the projection 8' engages in the slot 3 and thereby the connecting element 12 and the toy structural element 5 becomes firmly connected with one another in pulling-resistant manner. For facilitating the insertion of the projection 8' into the transverse slot 3, the projection 8' has a tip which is rounded or pointed.

It will be understood that each of the elements described above, or two or more together, may also find a useful application in other types of constructions differing from the types described above.

While the invention has been illustrated and described as embodied in a connecting element for connecting toy structural elements having openings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pin-shaped connecting element in combination with toy structural elements each having at least two openings which intersect one another and have a predetermined diameter, the connecting element comprising an elongated body part having a portion with a diameter exceeding the diameter of the openings of the structural elements, said portion having at least one longitudinal slot extending over said portion so as to render the latter resiliently yieldable, and a plurality of transverse slots extending transversely to and intersecting said longitudinal slot over a part of the periphery of said portion and subdividing the latter into at least three sections which are thereby resiliently yieldable independently of one another, said transverse slots being arranged so that said portion can be inserted into one of the openings of one of said structural elements, with said transverse slots being located in the region of the other of the openings, which intersect the one opening; means for arresting said portion of said body part in the one opening of the structural element, said arresting means including an arresting member which is arranged to extend through the other intersecting opening of the structural element and having two projections engageable in said transverse slots of said portion, when said arresting member extends through the other intersecting opening of the one structural element and said transverse slots are located in the region of said other intersecting opening; and means for reinforcing said two projections of said arresting member, said reinforcing means including a web which extends between and connects said two projections with one another.

2. A connecting element as defined in claim 1, wherein said arresting member has a collar which carries said projections and is engageable in the other intersecting opening of the structural element.

3. A connecting element as defined in claim 2, wherein the other intersecting opening of the structural element has a predetermined diameter, said collar of said arresting member having a diameter which corresponds to the diameter of the other intersecting opening.

4. A connecting element as defined in claim 2, wherein the structural element has an outer surface, said arresting member having a head which carries said collar and is arranged to abut against the outer surface of the structural element.

5. A connecting element as defined in claim 1, wherein said web of said reinforcing means is arranged so that when said arresting member extends through the other intersecting opening of the structural element, said web engages in said longitudinal slot of said portion of said body part.

6. A connecting element as defined in claim 1, wherein said arresting element has a collar which carries said projections and is engageable in the other intersecting opening, said collar having an axis, and said projections being arranged at two opposite sides of said axis.

7. A connecting element as defined in claim 6, wherein said web extends through said axis of said collar of said arresting element.

8. A connecting element as defined in claim 7, wherein each of said projections has a tip which is leading in direction of insertion, said tip of each of said projections being rounded.

* * * * *